US012738706B2

(12) United States Patent
Fill et al.

(10) Patent No.: US 12,738,706 B2
(45) Date of Patent: Sep. 15, 2026

(54) METHOD AND LASER PULSE ENHANCEMENT APPARATUS FOR RESONANTLY ENHANCING PULSED LASER LIGHT FOR PRACTICAL APPLICATIONS AND SENSITIVE MEASUREMENTS

(71) Applicant: MAX-PLANCK-GESELLSCHAFT ZUR FOERDERUNG DER WISSENSCHAFTEN E. V., Munich (DE)

(72) Inventors: Ernst Fill, Garching (DE); Maximilian Hoegner, Garching (DE); Ferenc Krausz, Garching (DE); Ioachim Pupeza, Garching (DE); Ann-Kathrin Raab, Garching (DE); Liudmila Voronina, Garching (DE); Mihaela Zigman, Garching (DE)

(73) Assignee: MAX-PLANCK-GESELLSCHAFT ZUR FOERDERUNG DER WISSENSCHAFTEN E. V., Munich (DE)

( * ) Notice: Subject to any disclaimer, the term of this patent is extended or adjusted under 35 U.S.C. 154(b) by 547 days.

(21) Appl. No.: 18/282,008

(22) PCT Filed: Mar. 22, 2022

(86) PCT No.: PCT/EP2022/057493
§ 371 (c)(1),
(2) Date: Sep. 14, 2023

(87) PCT Pub. No.: WO2022/207410
PCT Pub. Date: Oct. 6, 2022

(65) Prior Publication Data
US 2024/0170907 A1 May 23, 2024

(30) Foreign Application Priority Data
Mar. 31, 2021 (EP) .................................... 21166313

(51) Int. Cl.
*H01S 3/00* (2006.01)
*G01N 21/35* (2014.01)
*G01N 21/3504* (2014.01)

(52) U.S. Cl.
CPC ....... *H01S 3/0092* (2013.01); *G01N 21/3504* (2013.01); *H01S 3/005* (2013.01);
(Continued)

(58) Field of Classification Search
CPC ............... G01N 21/35; G01N 21/3504; G01N 2201/0697
See application file for complete search history.

(56) References Cited

U.S. PATENT DOCUMENTS 9,705,279 B2 7/2017 Holzwarth et al.
2013/0215925 A1 8/2013 Kaster et al.
(Continued)

FOREIGN PATENT DOCUMENTS

CN 105720472 A 6/2016
JP 2016-510505 A 4/2016
(Continued)

OTHER PUBLICATIONS

Holzberger S. et al: "Enhancement cavities for zero-offset-frequency pulse trains", Optics Letters, vol. 40, No. 10, May 4, 2015, pp. 2165-2168. (Year: 2015).*
(Continued)

*Primary Examiner* — Michael Carter
(74) *Attorney, Agent, or Firm* — Caesar Rivise, PC

(57) ABSTRACT

A method of passively enhancing pulsed laser light by coherent addition of laser pulses in an enhancement cavity (20) comprises the steps of generating a sequence of seed laser pulses (1) with a repetition frequency frep and a frequency comb spectrum (3) comprising frequency comb
(Continued)

lines (4) with frequency comb line spacings equal to the repetition frequency frep, coupling the seed laser pulses (1) via a first plate-shaped coupling element (25) into an enhancement cavity (20) comprising at least two cavity mirrors (21, 22, 23, 24) having metallic surfaces and spanning a cavity beam path (26) with a resonator length L, wherein the enhancement cavity (20) has a fundamental transverse mode TEM00 and higher-order transverse cavity modes TEMnm, each with a series of cavity resonance frequencies (5), and a cavity offset frequency (6), and coherent superposition of the seed laser pulses (1) in the enhancement cavity (20), so that at least one enhanced circulating cavity pulse (2) per cavity length is generated, wherein the frequency comb spectrum (3) is a harmonic frequency comb spectrum (3) with a vanishing seeding comb offset frequency, the enhancement cavity (20) is adjusted such that a round-trip carrier-envelope phase slippage of the circulating cavity pulses 2 is equal to 360°/N for the fundamental transverse mode TEM00, N being an integer number equal to or above (2), and a frequency overlap is provided for a plurality of the cavity resonance frequencies (5) with a plurality of the frequency comb lines (4) along the frequency comb spectrum (3). Furthermore, a laser pulse enhancement apparatus and applications thereof, e. g. in field-resolved spectroscopy, are described.

20 Claims, 5 Drawing Sheets

(52) U.S. Cl.
CPC .......... *H01S 3/0057* (2013.01); *H01S 3/0064* (2013.01); *G01N 21/35* (2013.01); *G01N 2201/0697* (2013.01)

(56) References Cited

U.S. PATENT DOCUMENTS

2015/0340833 A1 11/2015 Pupeza et al.
2019/0301933 A1 10/2019 Allison

FOREIGN PATENT DOCUMENTS

JP 2016-119476 A 6/2016
WO 2016102056 A1 6/2016

OTHER PUBLICATIONS

Femtosecond pulse amplification by coherent addition in a passive optical cavity, Optics Letters, vol. 27, No. 20, Oct. 15, 2002, p. 1848. (Year: 2002).*
Axner et al. (2014). NICE-OHMS—Frequency modulation cavity-enhanced spectroscopy—principles and performance. in Cavity Enhanced Spectroscopy and Sensing, G. Gagliardi and H.P. Loock (eds), Springer Series in Optical Sciences 179, Springer Berlin, Heidelberg, 211-251.
Fill et al. "A Pellicle Coupled Optical Resonator" in 2019 Conference on Lasers and Electro-Optics Europe and European Quantum Electronics Conference, OSA Technical Digest (Optical Society of America, 2019), paper cf_p. 60.
Foltynowicz et al. (2011). Quantum-noise-limited optical frequency comb spectroscopy. Physical Review Letters, 107, 233002.
Foltynowicz et al. (2013). Cavity-enhanced optical frequency comb spectroscopy in the mid-infrared application to trace detection of hydrogen peroxide. Appl. Phys. B, 110, 163-175.
Gotti et al. (2020). Comb-locked frequency-swept synthesizer for high precision broadband spectroscopy. Scientific Reports 10, 2523.
Holzberger et al. (2015). Enhancement cavities for zero-offset-frequency pulse trains. Optics Letters, 40(10), 2165-2168.
Jones et al. (2002). Femtosecond pulse amplification by coherent addition in a passive optical cavity. Optics Letters 27(20), 1848-1850.
Jones et al. (2004). High-repetition-rate coherent femtosecond pulse amplification with an external passive optical cavity. Optics Letters, 29(23), 2812-2814.
Khodabakhsh et al. (2014). Noise-immune cavity-enhanced optical frequency comb spectroscopy. Optics Letters, 39(17), 5034-5037.
Lykke (1998). Internally-coupled build-up cavity for frequency doubling of cw lasers. Optics Communications. 157, 88-92.
Pupeza et al.(2020). Field-resolved infrared spectroscopy of biological systems. Nature, 577, 52.
Romanini et al. (2014). Introduction to cavity enhanced absorption spectroscopy. in Cavity Enhanced Spectroscopy and Sensing, G. Gagliardi and H.P. Look (eds), Springer Series in Optical Sciences 179, pp. 1-60, Springer Berlin, Heidelberg.
Torgerson et al. (1999). Tunable cavity coupling scheme using a wedged plate. Optics Communications, 161, 264-266.
Zeng et al. (2019). Introductory lecture: advances in ion spectroscopy: from astrophysics to biology. Faraday Discussions. 217, 8-33.
Zhao et al. (2018). Shot-noise-limited Doppler-broadened noise-immune cavity-enhanced optical heterodyne molecular spectrometry. Optics Letters, 43(4), 715-718.
International Search Report for PCT/EP2022/057493 dated Jun. 29, 2022.
Decision to Grant issued Jan. 30, 2025 in JP 2023-558872 with partial translation.

* cited by examiner

METHOD AND LASER PULSE ENHANCEMENT APPARATUS FOR RESONANTLY ENHANCING PULSED LASER LIGHT FOR PRACTICAL APPLICATIONS AND SENSITIVE MEASUREMENTS

CROSS-REFERENCE TO RELATED APPLICATIONS

This application is a U.S. National Phase Application of PCT/EP2022/057493, filed Mar. 22, 2022, which claims priority to EP 21166313.3, filed Mar. 31, 2021, the contents of which applications are incorporated herein by reference in their entireties for all purposes.

FIELD OF THE INVENTION

The invention relates to a method of passively enhancing pulsed laser light by coherent addition of laser pulses in an enhancement cavity. Furthermore, the invention relates to a laser pulse enhancement apparatus including an enhancement cavity, for passively enhancing pulsed laser light by coherent addition of laser pulses. The main application of the invention is in the field of laser spectroscopy. Other applications are available in the technical fields of modifying laser pulses and/or generating high intensity harmonic pulses, soft X-rays, hard X-rays and THz-radiation.

TECHNICAL BACKGROUND

In the present specification, reference is made to the following prior art illustrating technical background of the invention and related techniques:

[1] R. J. Jones et al., Optics Letters 27, 1848 (2002);
[2] K. R. Lykke, Optics Commun. 157, 88 (1998);
[3] J. Torgerson et al., Optics Commun. 161, 264 (1999);
[4] E. Fill et al. "A Pellicle Coupled Optical Resonator" in 2019 Conference on Lasers and Electro-Optics Europe and European Quantum Electronics Conference, OSA Technical Digest (Optical Society of America, 2019), paper cf_p_60;
[5] S. Holzberger et al., Optics Letters 40, 2165 (2015);
[6] A. Foltynowicz et al., Phys. Rev. Lett. 107, 233002 (2011);
[7] A. Foltynowicz et al., Appl. Phys. B 110, 163 (2012);
[8] O. Axner et al., "NICE-OHMS—Frequency Modulation Cavity Enhanced Spectroscopy—Principles and Performance" in "Cavity Enhanced Spectroscopy and Sensing", G. Gagliardi and H. P. Look (eds), Springer Series in Optical Sciences 179, Springer Berlin, Heidelberg 2014;
[9] A. Khodabakhsh et al., Optics Letters 39, 5034 (2014);
[10] R. Gotti et al., Scientific Reports 10, 2523 (2020);
[11] G. Zhao et al., Optics Letters 43, 715 (2018);
[12] H. J. Zeng, et al. Introductory lecture: Advances in ion spectroscopy: From astrophysics to biology. Faraday Discuss. 217, 8-33 (2019);
[13] D. Romanini et al., "Introduction to Cavity Enhanced Absorption Spectroscopy" in "Cavity Enhanced Spectroscopy and Sensing", G. Gagliardi and H. P. Look (eds), Springer Series in Optical Sciences 179, Springer Berlin, Heidelberg 2014;
[14] WO 2016/102056; and
[15] I. Pupeza et al., Nature 577, 52 (2020).

Coherent addition of laser pulses in a passive resonator (enhancement cavity) is described by R. J. Jones et al. [1]. A sequence of phase-coherent, equidistant pulses (seed laser pulses) is coupled into a resonator device comprising two mirrors (linear cavity) or three, four or more mirrors arranged in a ring-resonator geometry. The resonator device forms a light path, which is adjusted such that input light pulses are linearly superimposed in succession to form at least one circulating cavity light pulse. The circulating cavity light pulse is usually obtained by coupling seed laser pulses into the cavity by means of a slightly transparent mirror, although coupling in through a plate or a wedge has been described by K. R. Lykke [2], J. Torgerson et al. [3] and E. Fill et al. [4].

Such conventional resonant enhancement of pulsed laser light using a passive enhancement cavity has severe limitations in terms of the spectral bandwidth of the circulating pulses. In particular, the limited bandwidth and the dispersion of the cavity mirrors prevent a broad frequency comb from being enhanced in the resonator. However, a broad spectral bandwidth is especially important for the generation of ultrashort pulses and in sensitive absorption spectroscopy (trace gas detection, e. g. with field-resolved spectroscopy, FRS).

In frequency domain, the input light pulses provide a frequency comb which consists of frequency comb lines spanning a frequency comb spectrum. The frequency comb lines have a comb line spacing equal to the repetition frequency of the input light pulse sequence and an input comb offset frequency. An additional requirement for broadband enhancement is that an optimum offset frequency (OOF) of the resonator, determined by the optics and the geometrical phase [5], and the input comb offset frequency are matched to each other. Especially for FRS, where a harmonic comb (comb with input comb offset frequency equal to zero) is used and therefore the input offset frequency cannot be tuned, a broadband method is required to tailor the OOF of the resonator cavity.

There are several possibilities to tune the resonator cavity to a specific OOF. The most effective way in the NIR is to use cavity mirrors with a tailored CE phase shift as proposed in [5]. However, this approach has not been demonstrated in the MIR spectral range and brings about bandwidth limitations.

Employing a resonant cavity for trace gas detection has been described in the past as follows. In 2011, it was shown that shot noise-limited absorption spectroscopy is possible by using a cavity. However, the spectral bandwidth in this experiment was only 30 nm, centered at 1530 nm [6]. The first mid-infrared cavity experiment carried out by the same group showed a sensitivity of 8 ppb in a wavelength range of 3500 to 4100 nm [7]. The most sensitive method for trace gas detection has been NICE-OHMS (noise immune cavity enhanced optical heterodyne molecular spectroscopy) [8]. However, this technique is inherently narrowband and therefore not suitable for the analysis of complex gas mixtures. Furthermore, it was attempted to implement the NICE-OHMS technique with a frequency comb as described by A. Khodabakhsh et al. [9]. Still the spectral range of this experiment is quite narrow and extends only between 1585 and 1590 $cm^{-1}$, corresponding to 20 nm.

Recently, progress has been achieved with respect to the sensitivity, but the spectral bandwidth reported is still very limited: detection of $CO_2$ and $C_2H_2$ with a sensitivity of $10^{-10}$ $cm^{-1}$ at a measurement time of <5 min with a bandwidth of 18 nm at 1.54 μm is described by R. Gotti et al. [10]. Applying a cavity finesse of 5000, acetylene is detected at 6518 $cm^{-1}$ as reported by G. Zao et al. with a bandwidth of 15.6 nm [11].

However, none of the existing techniques has achieved the sensitivity required to perform direct broadband spectroscopy of molecular ions stored in an ion trap, where the total number of molecules typically does not exceed $10^6$ [12]. This would open up potential applications ranging from astrophysics to analytical chemistry, biochemistry and quantum chemical simulations.

Objective of the Invention

The objective of the present invention is to provide an improved method of enhancing pulsed laser light using a passive enhancement cavity and an improved laser pulse enhancement apparatus, avoiding limitations of conventional techniques, in particular in terms of bandwidth and dispersion. In particular, the objective is to provide an enhancement of harmonic frequency combs (i.e., zero-offset-frequency combs), as used, e.g., in field-resolved spectroscopy (FRS). In particular, enhanced pulsed laser light is to be provided by coherently adding pulses for improved spectroscopic performance, in particular with a large spectral bandwidth, at a high intensity and/or minimized dispersion effects. Furthermore, the laser pulse enhancement apparatus is to be provided with a compact structure enabling stable operation in practical applications. Furthermore, new applications of pulsed laser light are to be provided.

SUMMARY OF THE INVENTION

The above objectives are solved by a method of passively enhancing pulsed laser light and a laser pulse enhancement apparatus of the invention.

According to a first general aspect of the invention, the above objective is solved by a method of passively enhancing pulsed laser light by coherent addition of laser pulses in an enhancement cavity, comprising the steps of generating a sequence of seed laser pulses (seeding comb) with a repetition frequency $f_{rep}$ and a frequency comb spectrum comprising frequency comb lines with frequency comb line spacings equal to the repetition frequency $f_{rep}$, coupling the seed laser pulses via a first plate-shaped coupling element into an enhancement cavity comprising at least two cavity mirrors having metallic surfaces (in the following also indicated as metallic cavity mirrors or metal coated cavity mirrors) and spanning a cavity beam path with a resonator length L, wherein the enhancement cavity has a fundamental mode ($TEM_{00}$) and higher-order transverse cavity modes ($TEM_{nm}$), each with a series of cavity resonance frequencies, and a cavity offset frequency, and coherent superposition of the seed laser pulses in the enhancement cavity, so that at least one enhanced circulating cavity pulse per cavity length is generated.

According to the invention, the frequency comb spectrum is a harmonic frequency comb spectrum with a vanishing seeding comb offset frequency. Furthermore, according to the invention, the enhancement cavity is adjusted such that a round-trip carrier-envelope phase (CEP) slippage of the circulating cavity pulses is equal to 360°/N for the fundamental transverse mode $TEM_{00}$, N being an integer number equal to or above 2, and a frequency overlap is provided for a plurality of the cavity resonance frequencies with a plurality of the frequency comb lines along the frequency comb spectrum. The CEP slippage is an amount of phase change of the phase between the electric carrier light field and the pulse envelope of the circulating pulses during one round trip in the enhancement cavity. Providing the frequency overlap means matching the seeding comb and/or the enhancement cavity such that cavity resonance frequencies are located at the frequencies of the frequency comb lines.

According to a second general aspect of the invention, the above objective is solved by a laser pulse enhancement apparatus, being adapted for passively enhancing pulsed laser light by coherent addition of laser pulses and comprising a laser source device being configured for generating a sequence of seed laser pulses with a repetition frequency $f_{rep}$ and a frequency comb spectrum comprising frequency comb lines with frequency comb line spacings equal to the repetition frequency $f_{rep}$, an enhancement cavity comprising at least two cavity mirrors having metallic surfaces and spanning a cavity beam path with a resonator length L, wherein the enhancement cavity has a fundamental mode ($TEM_{00}$) and higher-order transverse cavity modes ($TEM_{nm}$), each with a series of cavity resonance frequencies, and a cavity offset frequency, and a first plate-shaped coupling element being arranged for coupling the seed laser pulses into the enhancement cavity, wherein the enhancement cavity is adapted for a coherent superposition of the seed laser pulses coupled into the enhancement cavity, so that at least one enhanced circulating cavity pulse is generated.

According to the invention, the laser source is configured for generating the seed laser pulses having a harmonic frequency comb spectrum with a vanishing seeding comb offset frequency, the enhancement cavity is adjusted such that a round-trip carrier-envelope phase slippage of the circulating cavity pulses is equal to 360°/N for the fundamental transverse mode $TEM_{00}$, N being an integer number equal to or above 2, and the laser source device and the enhancement cavity are adapted for providing a frequency overlap for a plurality of the cavity resonance frequencies with a plurality of the frequency comb lines along the frequency comb spectrum. Preferably, the inventive laser pulse enhancement apparatus or an embodiment thereof is adapted for executing the method according to the first general aspect of the invention or an embodiment thereof.

The enhancement cavity is a linear cavity, or it has a ring-resonator geometry. The cavity mirrors can be plane or curved mirrors, wherein preferably at least one curved mirror provides a focussed cavity beam path (cavity beam path having at least one focus). The enhancement cavity is preferably free of light field amplifying media, that are adapted for amplifying the light field of the circulating cavity pulse(s). An important advantage of the invention is that, in contrast to [5], the dispersion of the pulses circulating in the cavity can be made very low by the provision of the metallic cavity mirrors (i. e. the mirrors having a metallic surface), that allow, in principle, operation over a very broad bandwidth. Preferably, all mirrors of the enhancement cavity are metallic mirrors.

The metallic cavity mirrors are used despite of the general phase shift effect thereof. In particular, metal mirrors have a CEP shift of 180°. The total CEP shift (round-trip phase shift) of a cavity is composed of all CEP shifts of the mirrors plus the geometric phase shift (Gouy phases). The geometric phase shift can be 0° or 180° only at the stability edges of the cavity. Furthermore, the total CEP shift and the optimum offset frequency (OOF) of the resonator are related to each other. OOF equal to 0° is equivalent to a total CEP shift equal to 0°. Before the invention, obtaining a total CEP shift equal to 0° and setting the OOF to 0°, i. e. enhancing harmonic combs with a cavity having metallic mirrors and a geometric phase shift not equal to 180° or 0°, was considered to be impossible in practice.

However, using the metallic mirrors and thus providing the broad bandwidth characteristic of pulse enhancement is made possible by the invention as the inventors have found a new approach for setting the optimum offset frequency of the resonator, so that, in contrast to [4], the cavity resonances can be matched to the seeding comb lines. Firstly, the cavity is tuned to the roundtrip carrier-envelope phase slippage of 360°/N for the fundamental transverse mode $TEM_{00}$, preferably by varying the focusing geometry of the enhancement cavity, in particular by setting a distance between at least two mirrors and/or a deflection angle of at least one mirror relative to the cavity beam path. Furthermore, the cavity resonance frequencies are overlapped with, in particular matched to, the frequency comb lines of the seed laser pulses, in particular by changing the cavity length by a corresponding factor or by exciting a higher-order transverse cavity mode, as outlined below. Advantageously, frequency matching is obtained over an extended portion of the comb spectrum, preferably over the whole comb spectrum, so that broadband harmonic frequency combs can be enhanced.

Broadband operation of the enhancement cavity preferably refers to enhancing laser pulses having a center wavelength in a range from 1000 nm, in particular from 5 μm, to 20 μm and a spectral bandwidth of at least 100 nm, in particular at least 5000 nm, and/or at most 20 μm, in particular at most 12 μm. Preferably, the enhanced frequency comb of the cavity pulses covers at least an octave of optical frequencies. As a practical example, a range of the center wavelength from 5 am to 20 μm is of particular interest as it covers the characteristic spectral response range (so called fingerprint region) of biological samples. The enhancement cavity is capable of enhancing laser pulses with the above parameters, which is in contrast to conventional enhancement cavities for high harmonic generation using pulses having a center wavelength of e. g. 800 nm and a spectral bandwidth of e. g. 200 nm. These conventional enhancement cavities are not restricted to harmonic combs, and they can use dielectric mirrors.

According to a further important advantage of the invention, the spectral transfer function between cavity input and output has such a low dispersion, that the pulse duration of the broadband pulses is not affected or affected in a negligible manner. This characteristic is important for the application of the invention in FRS as keeping the broadband characteristic means providing the enhanced pulses with short durations, thus minimizing a temporal overlap between the pulse exciting a sample and a sample response and therefore reducing intensity noise in FRS.

According to a preferred embodiment (in the following indicated as the first embodiment of the invention, see FIG. 3), the frequency overlap is provided by adjusting the resonator length of the enhancement cavity according to $L^*=(c/f_{rep})/N$, c being the speed of light, and exciting the fundamental transverse mode ($TEM_{00}$) of the enhancement cavity. The cavity resonance frequency spacing of the fundamental cavity resonance frequencies is equal to $c/L^*$, and the frequency overlap is provided for each of the cavity resonance frequencies with each Nth of the frequency comb lines, resp. Advantageously, by choosing the cavity length $L^*$ as a fraction of 1/N of a fundamental length $L=(c/f_{rep})$ given by the pulse repetition frequency of the seed laser pulses, frequency matching with each Nth frequency comb line is obtained. Setting the cavity length $L^*$ can be obtained e. g. by setting a distance between at least two mirrors of the cavity. The first embodiment has particular advantages in terms of easy adjustment of the enhancement cavity by shortening the resonator length thereof.

According to an alternative preferred embodiment (in the following indicated as the second embodiment of the invention, see FIG. 4), the frequency overlap is provided by exciting one of the higher-order transverse cavity modes ($TEM_{nm}$), with n+m+1=N, of the enhancement cavity. The fundamental resonator length L of the enhancement cavity is kept according to $L=(c/f_{rep})$, c being the speed of light. The resonance frequency spacing of the cavity is equal to c/L, but the Gouy-phase-induced contribution to the offset frequency of the $TEM_{nm}$ cavity resonances is N times the Gouy-phase-induced contribution to the offset frequency of the $TEM_{00}$ resonances, and the frequency overlap is provided for each of the cavity resonances with one of the frequency comb line comb lines, resp. The second embodiment has particular advantages in terms of improved efficiency as all frequency comb lines of the comb spectrum contribute to the enhancement.

Preferably, the second embodiment is combined with a shaping of the optical field of the seed laser pulses such that a spatial overlap with the higher order mode ($TEM_{nm}$) of the enhancement cavity excited by the circulating cavity pulses is improved. With a preferred example, the laser source device is operated such that the output thereof comprises seed laser pulses with a geometrical mode structure adapted to the higher order mode. Alternatively, the laser source device is operated such that the output thereof comprises seed laser pulses with a fundamental mode structure and a mode matching device is provided between the laser source device and the enhancement cavity for adapting the mode structure to the geometry of the higher order cavity mode.

Preferably, the seed laser pulses are created by difference frequency generation (DFG). Accordingly, the laser source device preferably is adapted for creating the seed laser pulses by difference frequency generation. Particularly preferred, the laser source device comprises a pulsed laser source emitting laser pulses driving the DFG, particularly preferred with a duration below 20 fs, and a DFG device being arranged for intra pulse DFG of the pulses output by the pulsed laser source. The output of the DFG device provides the seed laser pulses, which inherently have zero offset frequency and high phase stability.

The first plate-shaped coupling element is provided for coupling the seed laser pulses into the enhancement cavity by reflecting the seed laser pulses into the cavity beam path. The first plate-shaped coupling element is positioned in the cavity beam path. For improving the broadband enhancement, the first plate-shaped coupling element preferably comprises at least one of the following features, that provide advantages in terms of reducing losses experienced by the cavity pulses circulating in the cavity and adjusting the power coupling ratio in accord with an optimum value determined by the reflectivity of the cavity mirrors.

Preferably, the first plate-shaped coupling element comprises a pellicle, a plate or a wedge element. Advantageously, these examples of coupling elements minimize dispersion introduced into the enhancement cavity.

Advantageously, the first plate-shaped coupling element may have a one-sided anti-reflective coating. Thus, etalon effects (leading to bandwidth limitations) and additional losses due to power being reflected out of the cavity are avoided.

Furthermore, the first plate-shaped coupling element has a surface that can be oriented at an angle equal or close to the Brewster angle relative to the cavity beam path. In case of using of a thin wedge, one wedge surface is oriented exactly at or close to the Brewster angle. Again, etalon effects are avoided.

If, according to a further variant, the first plate-shaped coupling element has low transmission losses in a wavelength region between 7 μm and 12 μm, particular advantages for enhancing frequency combs in this wavelength range and for employing the cavity pulses for spectroscopic measurements are obtained.

According to a preferred material choice, the first plate-shaped coupling element can be made of polyethylene or diamond. This is in contrast to commercially available pellicles, that are made, e.g., of nitrocellulose, which exhibits strong absorption in the mid-infrared region.

Preferably, the first plate-shaped coupling element has a thickness below a center wavelength of the seed laser pulses, so that interference effects are avoided in an advantageous manner. Particularly preferred, the first plate-shaped coupling element has a thickness in a range from 100 nm to 500 μm.

According to a further advantageous variant of the invention, one of the cavity mirrors is placed outside a resonator plane spanned by the cavity beam path entering and leaving the first plate-shaped coupling element. With this non-planar embodiment (see e. g. FIG. 6), the losses per cavity round-trip can be reduced in an advantageous manner by providing the enhanced circulating cavity pulse at the out-of-plane mirror and at the plate-shaped coupling element with selected polarizations. Preferably, the enhanced circulating cavity pulse is reflected off the cavity mirror being placed outside the resonator plane with grazing incidence in s polarization, while the enhanced circulating cavity pulse passes the first plate-shaped coupling element in p polarization. In particular, mirror reflection in s polarization allows better reflectivity than in p polarization. Furthermore, p polarization at the plate-shaped coupling element allows taking advantage of the Brewster angle of the plate-shaped coupling element.

According to another embodiment of the invention, a portion of the circulating enhanced cavity pulse(s) is coupled out of the enhancement cavity after an interaction with a sample, e. g. for a spectroscopic measurement. Coupling pulses out of the cavity preferably is done via the first plate-shaped coupling element or via a separate second plate-shaped coupling element. Using the single first plate-shaped coupling element, has advantages in terms of reduced complexity of the setup. Output coupling the portion of the circulating cavity pulses at the first plate-shaped coupling element may include deflecting a portion of the circulating light field out of the cavity, wherein this portion of the circulating light field does not interfere with a part of the seed laser pulses transmitted at the first plate-shaped coupling element. Alternatively, the first plate-shaped coupling element can be arranged and the cavity beam path can be folded such that the coupling element intersects the cavity beam path at one or two positions. Alternatively, using the second plate-shaped coupling element has advantages in terms of independently optimizing coupling the seed laser pulses into the cavity and light pulses out of the cavity. The second plate-shaped coupling element preferably is configured with at least one of the above preferred features of the first plate-shaped coupling element.

According to preferred application of the invention in spectroscopy, a portion of the seed laser pulses transmitted at the first plate-shaped coupling element is subjected to a spectroscopic measurement. Advantageously, in this transmitted beam, the transmitted light field of the seed laser pulses and a portion of the circulating light field deflected out of the cavity interfere. If the cavity does not contain a sample, preferably destructive interference occurs and this transmitted beam contains little to no power. If the cavity contains a sample, the transmitted beam contains mainly the spectroscopic response, i. e. the molecular signal, of the sample.

Thus, according to a particularly advantageous embodiment of the invention, a sample to be investigated, preferably a gaseous sample, like a gas, vapour or aerosol, is provided within the enhancement cavity, such that the circulating cavity pulses interact with the sample, and sample-specific information is extracted from the circulating cavity pulse that has interacted with the sample. For example, an absorption measurement is executed, wherein sample specific changes of the frequency comb spectrum of the circulating cavity pulses compared with the frequency comb spectrum of the seed laser pulses are detected. In terms of preferred device features of the laser pulse enhancement apparatus, the enhancement cavity is adapted for accommodating a sample to be investigated, such that the circulating cavity pulses interact with the sample, and a detector device is arranged for extracting sample-specific information from the circulating cavity pulses, e. g. for an absorption measurement by detecting sample specific changes of the frequency comb spectrum of the circulating cavity pulses compared with the frequency comb spectrum of the seed laser pulses. The detector device is arranged outside of the enhancement cavity, preferably for executing the measurement according to an available set-up, like the field resolved spectroscopy measurement.

With the inventive technique, preferably a broad harmonic frequency comb is effectively coupled into the cavity and enhanced. This is crucial for generating short pulses circulating in the cavity. Accordingly, a main application for the broadband cavity arises in sensitive absorption spectroscopy. The effective absorption length of a sample contained in a standing-wave resonant cavity is increased by a factor of $2/\pi F$, where F is the finesse of the cavity [12]. Most significant for detecting e. g. trace gas molecules in ambient gas is the so-called fingerprint region of the optical spectrum, which extends from about 500 to 1500 $cm^{-1}$ and the so-called functional group region of the spectrum (1500 to 4000 $cm^{-1}$). For sensitive measurements of a multitude of gases or gas mixtures a spectral region as broad as possible is interrogated. According to preferred applications of the invention, a range exceeding an octave of optical frequencies is readily feasible.

For the interaction inside the cavity, the sample can be arranged in an absorption tube accommodating a section of the cavity beam path of the enhancement cavity. Advantageously, the absorption tube limits the volume accommodating the sample, so that sample quantities to be investigated can be reduced. Alternatively, the sample can be supplied with a supply device to a restricted region of the cavity beam path, using e. g. a supply line and/or a nozzle. Thus, another important feature of the invention is sensitivity enhancement in combination with a small illuminated volume. This has advantages for applying the invention to direct absorption spectroscopy of thin samples, e.g. an electrospray or a molecular jet. Also, with other applications of the invention, concentrating the power to a small volume allows driving optical nonlinearities.

Alternatively, the sample can be arranged in a container accommodating the enhancement cavity. This embodiment has advantages resulting from the facilitated supply of the sample to the cavity.

Another possible application exploits the high finesse exhibited at a wavelength as low as 1 μm: this could be used for two-wavelength experiments, e.g. molecular alignment with a simultaneously resonant laser in the near infrared.

With the main application in spectroscopic measurements, the method of passively enhancing pulsed laser light is a measuring method, e. g. a spectroscopic measuring method, and the laser pulse enhancement apparatus is a measuring apparatus, e. g. a spectroscopic measuring apparatus, which both represent independent subjects of the invention.

Features disclosed in the context of the method of passively enhancing pulsed laser light and the embodiments thereof or the spectroscopic measuring method and the embodiments thereof also represent preferred features of the inventive laser pulse enhancement apparatus and spectroscopic measuring apparatus and the embodiments thereof. The aforementioned aspects and inventive and preferred features, in particular with regard to the configuration of the laser pulse enhancement apparatus and the spectroscopic measuring apparatus as well as the dimensions and compositions of individual components being described in relation to the apparatuses, also apply for the methods. The preferred embodiments, variants and features of the invention described above are combinable with one another as desired.

BRIEF DESCRIPTION OF THE DRAWINGS

Further details and advantages of the invention are described in the following with reference to the attached drawings, which schematically show in.

PREFERRED EMBODIMENTS OF THE INVENTION

Embodiments of the invention are described in the following with reference to the matching of the seeding comb lines with the resonance frequencies of the enhancement cavity and to exemplary configurations of the enhancement cavity. It is emphasized that implementing the invention in practice is not restricted to the described examples of laser sources and cavities but correspondingly possible with other available types of laser sources and cavity geometries and configurations. Details of creating the seed laser pulses or executing absorption measurements with samples are known per se, so that they are not shown or described.

Figure 1:
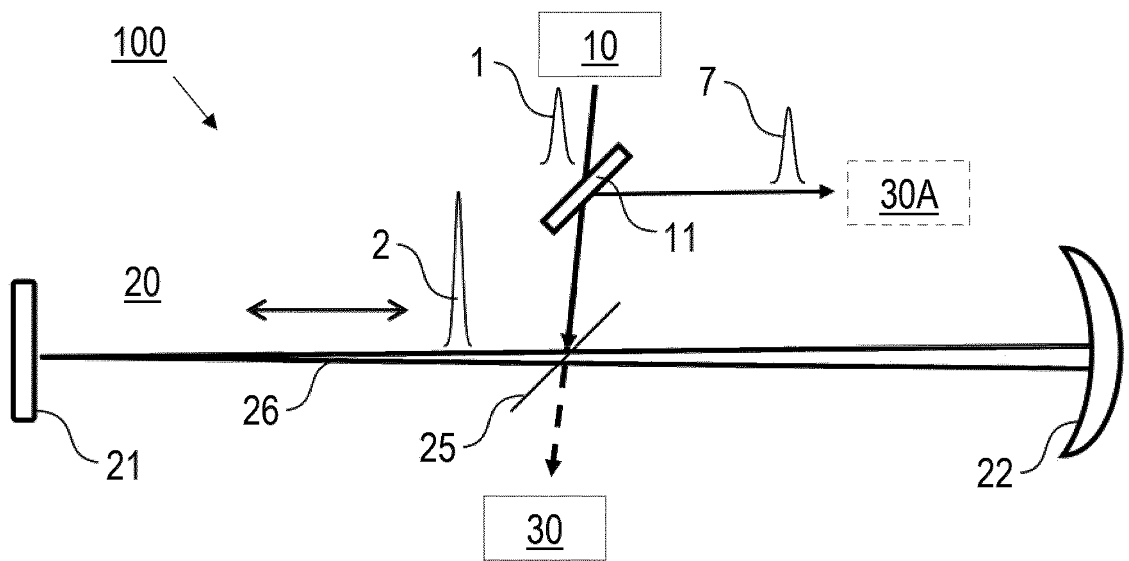
FIG. 1: features of preferred embodiments of the invention employing a linear cavity.

FIG. 1 shows an embodiment of a laser pulse enhancement apparatus 100 with a laser source device 10 and an enhancement cavity 20. The enhancement cavity 20 of this embodiment is a linear cavity, comprising two mirrors 21, 22, which have a gold surface and span a cavity beam path 26 with a resonator length L. At least one of the mirrors 21, 22 is curved to ensure resonator stability. A pellicle, a plate or a wedge is located as the first plate-shaped coupling element 25 within the enhancement cavity 20. The coupling element 25 intersects the cavity beam path 26. As an example, the coupling element 25 is a pellicle made of polyethylene with a thickness of 20 μm. The advantage of a linear cavity is its simplicity and the fact that only a single coupling element 25 is required for input and output coupling.

The laser source device 10 comprises e. g. an amplified mode locked laser and a DFG unit (details not shown). Seed laser pulses 1 are generated as a pulse sequence with a repetition frequency $f_{rep}$ and a frequency comb spectrum 3 comprising frequency comb lines 4 with frequency comb line spacings equal to the repetition frequency $f_{rep}$ (schematically shown in FIGS. 3B and 4B). For example, the seed laser pulses 1 have a center wavelength of 8 to 10 μm, a duration of 50-100 fs and a repetition frequency of 10 to several 100 MHz.

The seed laser pulses 1 are coupled through an optional semi-transmissive mirror 11 and the first plate-shaped coupling element 25 into the enhancement cavity 20 by illuminating the coupling element 25 at an angle close to the Brewster angle. The first plate-shaped coupling element 25 is e. g. a polyethylene pellicle with a thickness of 23 μm. The reflectivity of the input coupling element 25 is low, but destructive interference of the part of the seeding pulses that are transmitted through the input coupling element with the intracavity beam reflected off the input coupling element leads to efficient coupling of power into the cavity. The amplitude ratio of input coupled light is relatively low, but due to the low losses within the cavity, the enhanced power in the cavity is high. Furthermore, the low loss induced by the pellicle or plate and a low loss of the cavity mirrors 21, 22 leads to a high finesse of the cavity. Consequently, the effective absorption length of an absorption cell containing a sample of trace gas is increased by a significant factor (see FIG. 8).

Laser pulses coupled into the enhancement cavity 20 are coherently superimposed, so that one or more enhanced cavity pulse 2 per cavity length is/are generated, which circulate/s between the mirrors 21, 22 (see double arrow). At every passage through the coupling element 25, a portion 7 of the cavity pulse 2 is deflected out of the enhancement cavity 20 and via the semi-transmissive mirror 11 to an application site 30A. For spectroscopic applications and with a sample included in the cavity beam path 26, a portion of the seed laser pulses transmitted through the coupling element 25, coherently overlapped with a portion of the circulating pulses that have interacted with the sample, is collected with a detector device 30, e. g. for FRS.

For matching the frequency comb lines 4 of the frequency comb spectrum 3 to cavity resonance frequencies 5 according to the first embodiment of the invention, the resonator length L is set as described below with reference to FIG. 3. Alternatively, according to the second embodiment of the invention, seed laser pulses 1 are spatially shaped and coupled to higher order transverse modes of the cavity as described below with reference to FIG. 4.

Figure 2:
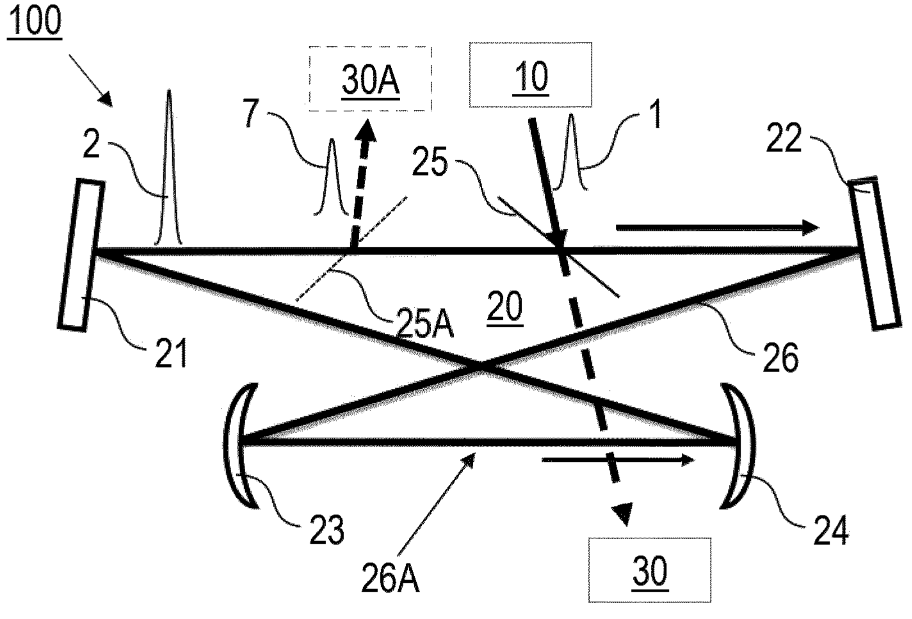
FIG. 2: features of preferred embodiments of the invention employing a bowtie cavity.

FIG. 2 illustrates features of alternative embodiments of the laser pulse enhancement apparatus 100 with the laser source device 10 and the enhancement cavity 20, which is a folded, so-called bowtie cavity with four gold coated mirrors 21, 22, 23, 24. Two of the mirrors (23, 24) are curved mirrors defining with a cavity focus 26A of the cavity light path 26 therebetween. The advantage of a bowtie cavity of FIG. 2 is a greater flexibility in adjusting parameters, such as finesse and CE-phase. Also, due to the travelling wave operation of the cavity, the first plate-shaped coupling element 25 is traversed only once during a circulation period. Because there is only one reflection at the plate-shaped coupling element per cavity round-trip, impedance matching and loss reduction and therefore optimum enhancement is possible. This travelling-wave advantage also can be obtained with the embodiments of FIGS. 3 to 7 and 9. Moreover, the cavity focus 26A is generated between the curved mirrors, a fact compulsory for some applications, e.g. harmonic generation or x-ray production.

Seed laser pulses 1 are created with the laser source device 10, e. g. like in FIG. 1, and coupled into the enhancement cavity 20, where they are coherently superimposed, so that e. g. one circulating enhanced cavity pulse 2 is generated, which circulates along the cavity beam path 26 (see arrows). For matching the frequency comb lines 4 of the frequency comb spectrum 3 of the seed laser pulses 1 to cavity resonance frequencies 5 the measures of the first or second embodiments of the invention are provided, as shown in FIGS. 3 and 4.

According to a first variant of this embodiment, two coupling elements 25, 25A, like e. g. pellicles or plates, are provided. The first plate-shaped coupling element 25 is arranged for coupling the seed laser pulses 1 from the laser source device 10 into the enhancement cavity 20. Following the arrow direction, the laser pulses circulate in the cavity, wherein the cavity pulse 2 is enhanced with each passage through the first plate-shaped coupling element 25 by coherent superposition with another seed laser pulse 1.

The optional second plate-shaped coupling element 25A is arranged with a distance from the first plate-shaped coupling element 25, e. g. in a cavity beam path section between the two plane mirrors 21, 22. The second plate-shaped coupling element 25A can have less reflectivity compared with the first plate-shaped coupling element 25. With each passage of the cavity pulse 2, a portion 7 of the cavity pulse 2 is reflected out of the cavity, wherein the reflected portion is less than the contribution of the seed laser pulse 1 coupled into the cavity. With a practical example, the first and second coupling elements 25, 25A are polyethylene films with a thickness of 20 μm, or diamond wedges with an average thickness of 350 μm, or 350-μm-thick plane-parallel diamond plates with a one-sided anti-reflection coating.

The second coupling element (shown dashed) may be provided for diagnostic purposes only, if the cavity pulse 2 is used in the enhancement cavity 20, e. g. for a spectroscopic measurement or driving an optical process, in the cavity focus 26A. Alternatively, it is arranged for coupling light to an application site 30A.

According to a second variant of the embodiment of FIG. 2 (preferred configuration for spectroscopy applications), the measurement apparatus 30 is arranged for collecting the beam transmitted by the first coupling element 25, coherently overlapped with a portion of the circulating pulses that have interacted with the sample, (right dashed arrow) and the second plate-shaped coupling element 25A is omitted. This configuration has advantages for time-resolved, background-free spectroscopy, like FRS, because then the enhancement is not reduced by a second plate and the exciting pulse (circulating enhanced pulse) is at least partially suppressed by destructive interference so that the molecular signal is less overlaid by it.

Figure 3:
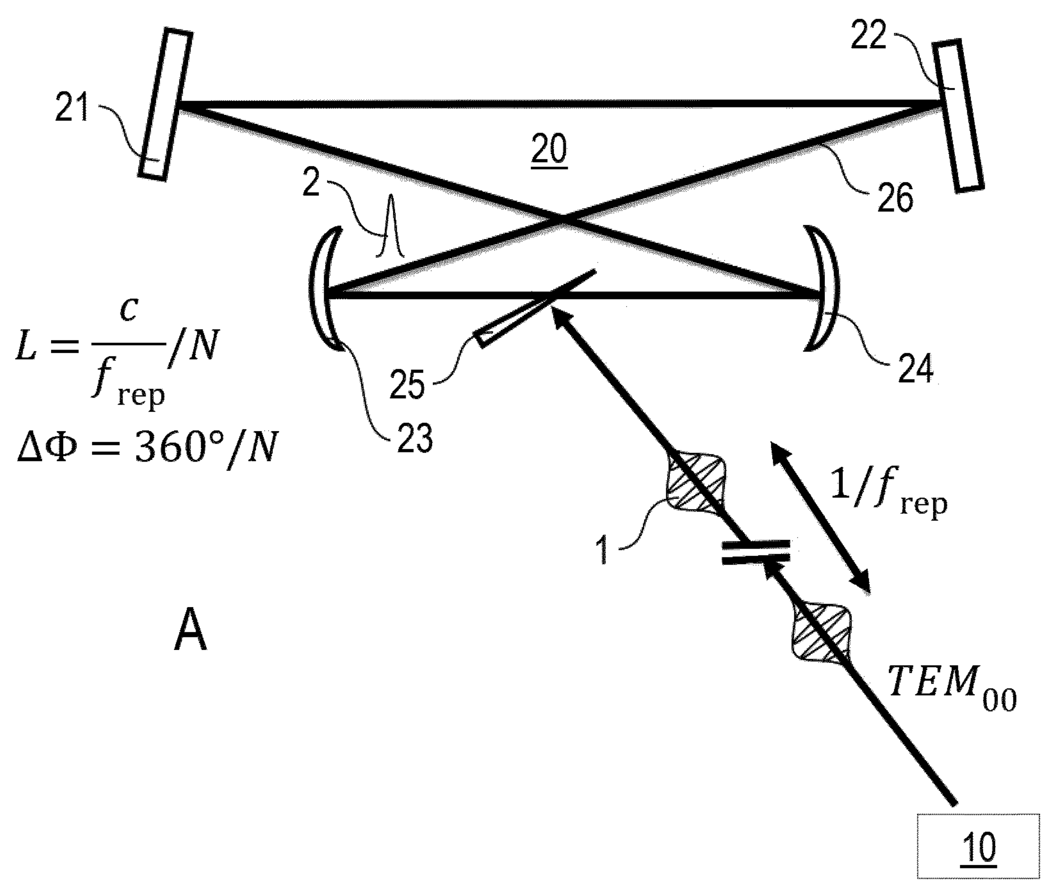
FIG. 3: an example of the first embodiment using a cavity shortened by a factor N to allow broadband enhancement of harmonic frequency combs with metallic mirror coatings.
Figure 3:
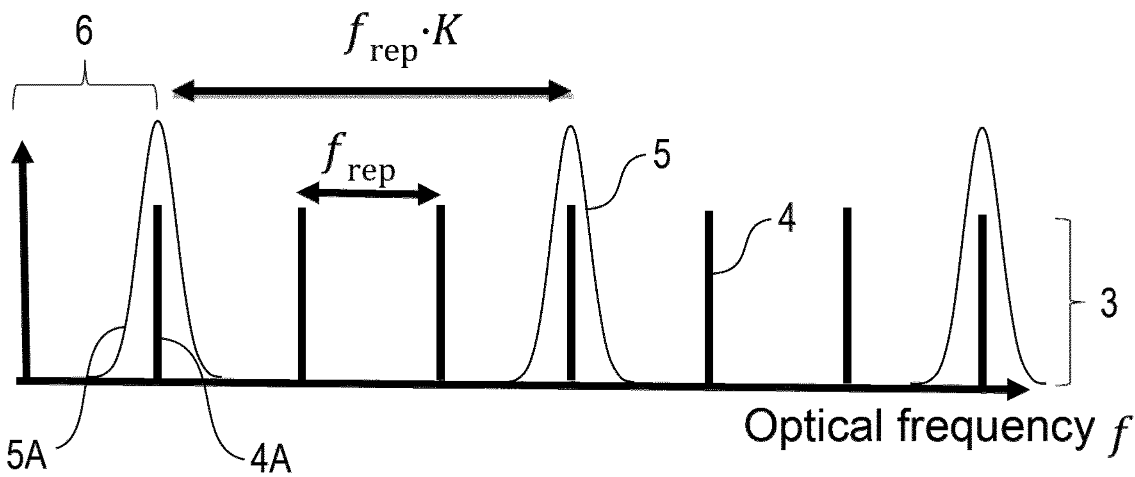
Figure 4:
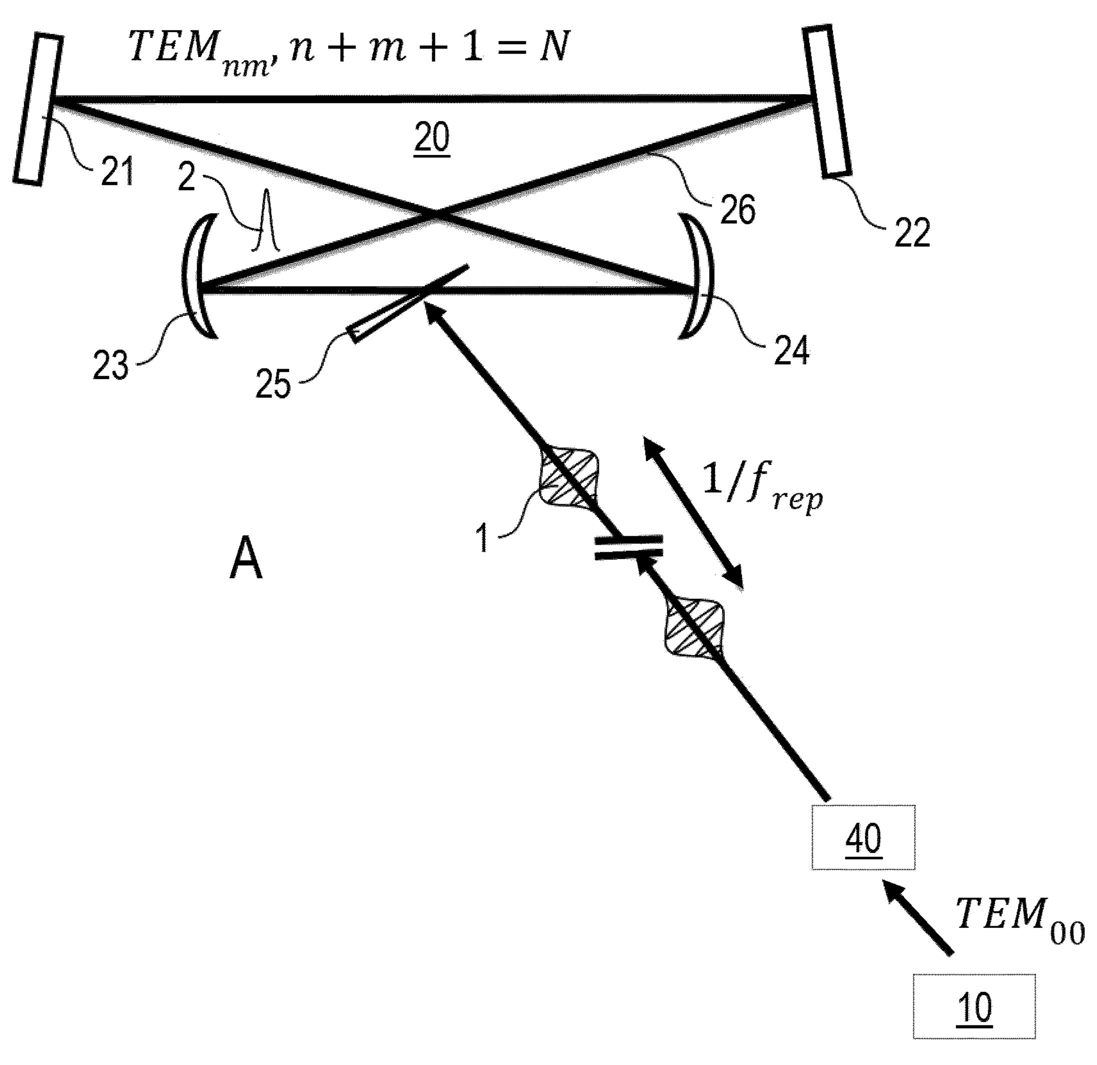
FIG. 4: an example of the second embodiment using a cavity operated with a higher-order transverse mode to allow broadband enhancement of harmonic frequency combs with metallic mirror coatings.
Figure 4:
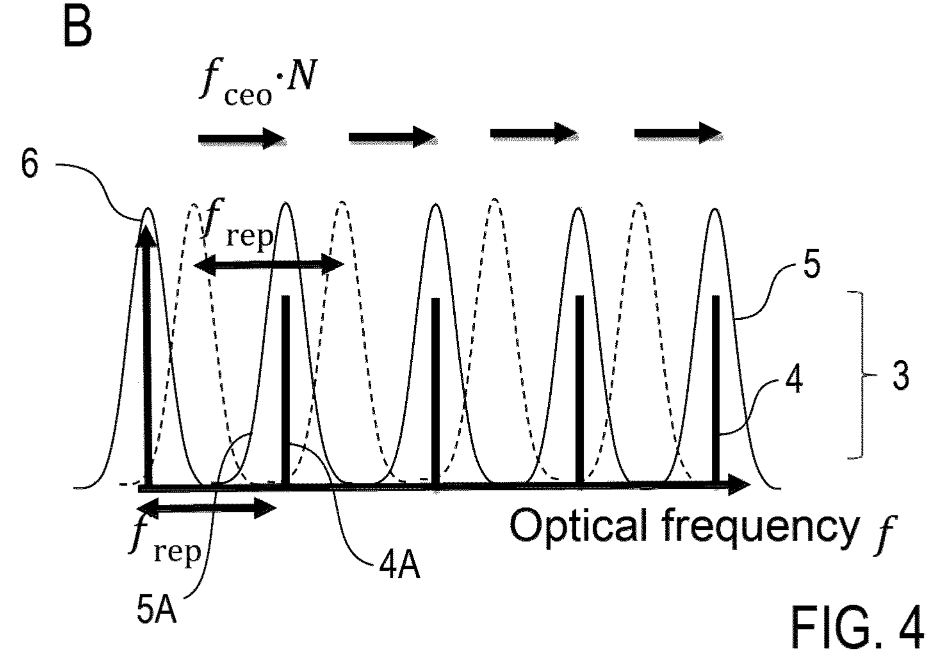

The first embodiment of the invention (frequency matching by resonator length adjustment) is illustrated in FIG. 3, wherein FIG. 3A shows a variant of a bowtie enhancement cavity 20 with four mirrors 21, 22, 23, 24 (as shown in FIG. 2), wherein the first plate-shaped coupling element 25 is a wedge element being arranged in the cavity focus between mirrors 23, 24. The mirrors 21, 22, 23, 24 span the cavity beam path 26 with a resonator length L. As shown in FIG. 3B, the enhancement cavity 20 has a fundamental mode $TEM_{00}$ with a series of fundamental cavity resonance frequencies 5 and a cavity offset frequency 6. Higher order modes of the enhancement cavity 20 are not employed with the first embodiment of the invention.

In the time domain (FIG. 3A), the seeding laser pulses 1 enter the enhancement cavity 20 with a repetition rate of $f_{rep}$. The seeding laser pulses have an optical field of the fundamental Gaussian mode $TEM_{00}$ emitted by the laser source device 10 and matched to the fundamental mode $TEM_{00}$ of the enhancement cavity 20. In the frequency domain (FIG. 3B), the frequency comb spectrum 3 of the seed laser pulses 1 has equidistant frequency comb lines 4 with spacings equal to $f_{rep}$. As the seed laser pulses 1 provide a harmonic comb, a frequency comb line 4A is located at $f_{rep}$ (input comb offset frequency equal to zero).

For matching the frequency comb lines 4 and the cavity resonance frequencies 5 to each other, at least one of the mirrors 21, 22, 23 and 24 of the enhancement cavity 20 is adjusted such that a roundtrip carrier-envelope phase slippage $\Delta\Phi=360°/N$ is obtained and the resonator length L is set according to L=c/frep/N, e. g. with N=3. The effect of these measures is shown in Figure frep 3B. The roundtrip carrier-envelope phase slippage results in a cavity offset frequency 6 equal to $f_{rep}/N$, thus shifting the first cavity resonance frequency 5A to the first frequency comb line 4A. Furthermore, in the frequency domain, the frequency of the cavity resonances is multiplied by the factor N compared to a resonant full-length cavity of a conventional cavity. Then, every Nth seed comb line 4 overlaps with a cavity resonance frequency 5. The frequency overlap is obtained along the whole comb spectrum 3, thus allowing a broadband enhancement of the harmonic frequency comb as the frequency matching is kept for each coherent superposition of a seed laser pulse 1 with a circulating cavity pulse 2. This broadband enhancement is obtained at the expense of decreasing the power enhancement factor by a factor of N.

The second embodiment of the invention (frequency matching by coupling to higher order cavity modes) is illustrated in FIG. 4, wherein FIG. 4A refers in an exemplary manner to the bowtie enhancement cavity 20 with four mirrors 21, 22, 23, 24 and the first plate-shaped coupling element 25 (wedge) being arranged in the cavity focus between mirrors 23, 24. The mirrors 21, 22, 23, 24 span the cavity beam path 26 with a resonator length L. With the second embodiment, higher order transverse modes of the enhancement cavity 20 are employed which have a series of higher order mode cavity resonance frequencies 5 with a cavity resonance offset frequency 6 that is a multiple of the cavity resonance offset frequency of the fundamental transverse mode, as shown in FIG. 4B.

In the time domain (FIG. 4A), the seeding laser pulses 1 enter the enhancement cavity 20 with a repetition rate of $f_{rep}$. The seeding laser pulses 1 are created with an optical field of the fundamental Gaussian mode $TEM_{00}$ emitted by the laser source device 10 and subsequently converted with a mode matching device 40, so that the optical field is matched to a higher order mode $TEM_{nm}$ of the enhancement cavity 20, with n+m+1=N, N being a natural number ≥2. The mode matching device 40 comprises at least one absorption and/or phase mask and optionally a cylindrical optic, being configured for geometrically shaping the optical field such that it is matched to the shape of the higher order mode $TEM_{nm}$ of the enhancement cavity 20, e. g. to the $TEM_{11}$ or $TEM_{20}$ mode.

In the frequency domain (FIG. 4B), the frequency comb spectrum 3 of the seed laser pulses 1 has equidistant frequency comb lines 4 with differences equal to $f_{rep}$. Like in FIG. 3, as the seed laser pulses 1 provide a harmonic comb, a frequency comb line 4A is located at 0 as well (input comb offset frequency equal to zero).

Deviating from the first embodiment, the resonator length L is set according to L=c/frep, i. e. to frep the resonant full-length cavity of a conventional cavity. Accordingly, in the frequency domain, the cavity resonance frequencies 5 have a spacing of $f_{rep}$ (FIG. 4B). Furthermore, like with the first embodiment, the enhancement cavity 20 is set, preferably by adjusting at least one of the mirrors 21, 22, 23 and 24, such that a roundtrip carrier-envelope phase slippage $\Delta\Phi$=360°/N, e. g. with N=3, is obtained. For an even number of mirrors with a metallic surface and the $TEM_{00}$ mode, this results in shifting the optimum offset frequency 6 to $f_{rep}/N$, so that the first cavity resonance frequency 5A overlaps with the first frequency comb line 4A. The frequency $f_{ceo}$ of the cavity resonances of the higher order mode $TEM_{nm}$ is increased compared to the frequency of the fundamental mode $TEM_{00}$ by the factor N. Then, all seed comb lines 4 overlap with one of the cavity resonance frequencies 5. Like with the first embodiment, this frequency overlap is obtained along the whole comb spectrum 3, thus allowing a broadband enhancement of the harmonic frequency comb as the frequency matching is kept for each coherent superposition of a seed laser pulse 1 with a circulating cavity pulse 2. Deviating from the first embodiment, this broadband enhancement is obtained for all successive resonances, so that the efficiency of the enhancement of the circulating cavity pulse 2 is increased.

Adjusting the resonator length according to the first embodiment or coupling to the higher order modes according to the second embodiment is not restricted to the bowtie geometry of the enhancement cavity 20, but also possible with all other configurations of enhancement cavities, like e. g. the embodiments of FIGS. 1 and 2 or the embodiments of FIGS. 5 to 9 described in the following.

Figure 5:
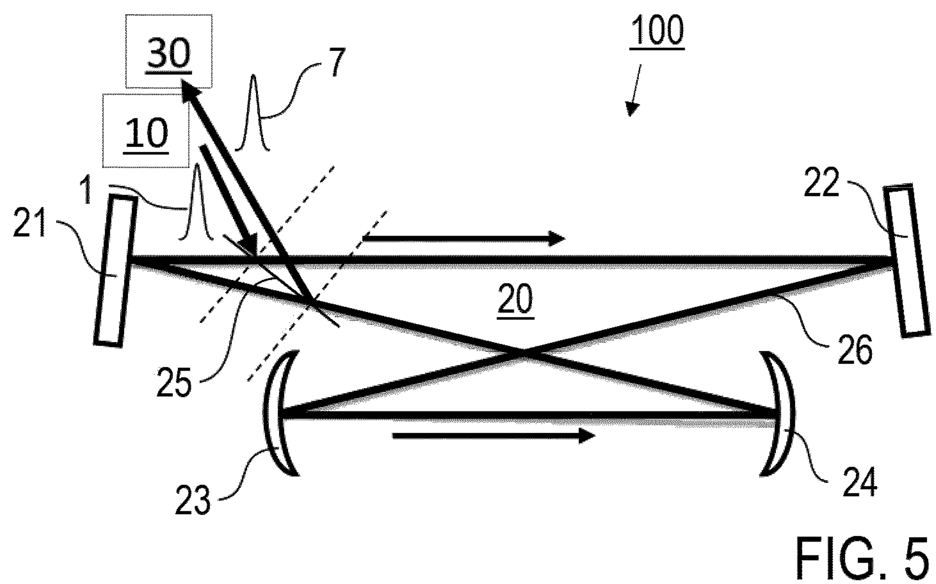
FIG. 5: an embodiment of coupling pulses into and out of a bowtie cavity by means of a single plate-shaped coupling element.

According to FIG. 5, the enhancement cavity 20 of the laser pulse enhancement apparatus 100 has a bowtie cavity geometry like in FIG. 2, wherein the cavity beam path 26 is spanned by four cavity mirrors 21, 22, 23 and 24. With this embodiment, a single plate-shaped coupling element 25 is provided for in- and output coupling. The coupling element 25 is arranged such that it intersects the cavity beam path 26 in two different beam path sections, resulting in slightly different angles of the surface of the coupling element 25 relative to the cavity beam path 26. The seed laser pulses 1 from the laser source device 10 can be coupled into the enhancement cavity 20 from another direction compared with the portion 7 of the enhanced cavity pulse(s) coupled out of the enhancement cavity 20 to an application site 30. This embodiment takes advantage of the fact that the angle between the beams reflected from the flat mirrors is very small.

Figure 6:
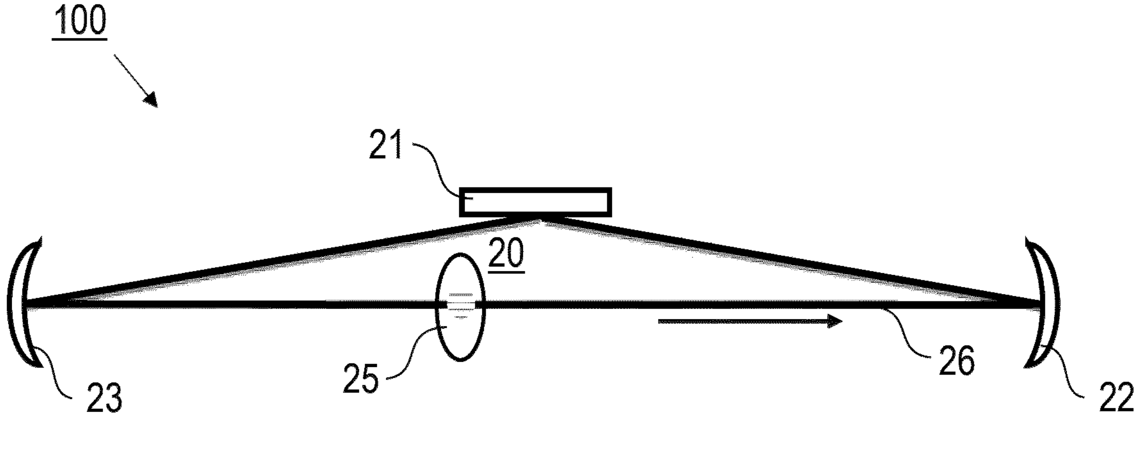
FIG. 6: a three-mirror cavity for travelling wave operation.

FIG. 6 shows a non-planar embodiment of a laser pulse enhancement apparatus 100 with a travelling wave enhancement cavity 20 using only three mirrors 21, 22 and 23. The flat mirror 21 is operated at a high angle of incidence. The advantage of this enhancement cavity 20 is that losses are lower than with a four-mirror cavity. In a preferred realization of this design, the incident and reflected beams at the flat mirror 21 span a plane that is perpendicular to the plane spanned by the incoming and transmitted beam at the first plate-shaped coupling element 25. For example, the latter plane is a horizontal x-y-plane of a platform carrying the laser pulse enhancement apparatus 100 (perpendicular to the plane of drawing) and the flat mirror 21 extends parallel to the horizontal x-y-plane. With this embodiment, the radiation can be p-polarized with respect to the first plate-shaped coupling element 25 and s-polarized with respect to the flat mirror 21, resulting in a very high reflectivity at high angle of incidence.

Figure 7:
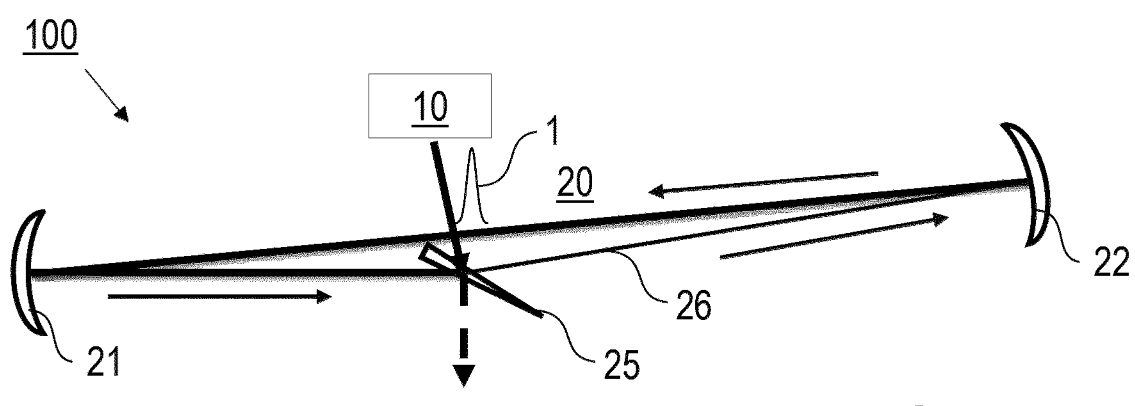
FIG. 7: a two-mirror cavity for travelling wave operation using a wedge as the coupling element.

The laser pulse enhancement apparatus 100 of FIG. 7 has a travelling wave enhancement cavity 20 comprising only two mirrors 21, 22. Contrary to the embodiment of FIG. 1, the cavity beam path 26 is not reflected into itself, but follows a ring geometry. This is made possible by coupling the seed laser pulses 1 in through a coupling element 25 comprising an oblique wedge. This design combines the advantages of a travelling wave cavity (one single passage through the coupling element 25 per circulation) with the low losses of a linear cavity.

Figure 8:
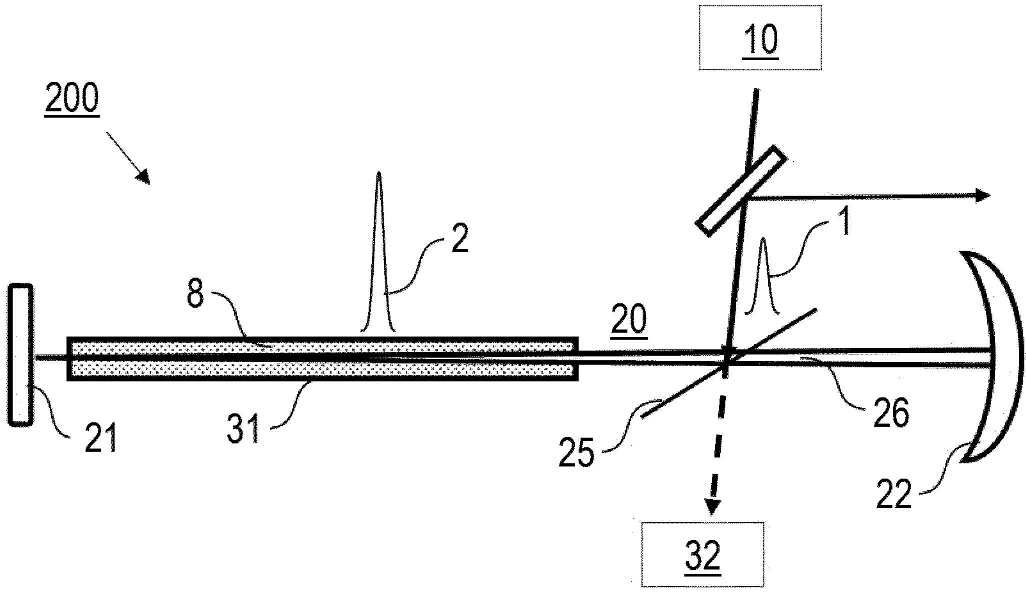
FIG. 8: a linear cavity that can be used for sensitive absorption measurements.

According to FIG. 8, the inventive laser pulse enhancement apparatus is configured as a spectroscopic measuring apparatus 200, including the laser source device 10, the enhancement cavity 20 and a detector device 32. The spectroscopic measuring apparatus 200 is adapted for sensitive spectroscopic trace gas detection and measurement. The enhancement cavity 20 has the configuration of a linear cavity as shown in FIG. 1, including two mirrors 21, 22 and a pellicle shaped coupling element 25. Additionally, an absorption tube 31 is arranged in the enhancement cavity 20. The absorption tube 31 is a hollow tube with a straight longitudinal extension, and it accommodates the cavity beam path 26. Axial ends of the absorption tube 31 can be open towards the enhancement cavity 20, or they can be closed by thin foil windows, alternatively also by AR-coated or Brewster windows. The absorption tube 31 is filled with a gaseous sample 8, like e. g. a molecular gas or gas mixture, to be analyzed.

The seed laser pulses 1, e. g. with a center wavelength of 8 to 10 μm, a duration of 50 to 100 fs and a repetition frequency of tens to hundreds of MHz, are coupled via the coupling element 25 into the enhancement cavity 20 and coherently added to the enhanced cavity pulse 2 circulating in the enhancement cavity 20. The cavity pulse 2 repeatedly passes the absorption tube 31, where it is absorbed by the sample 8. Following the absorption, a molecular response is coherently reemitted that has a shape of an optical field tail following the cavity pulse 2. The optical field tail is specifically determined by the spectroscopic features of the molecules in the sample 8.

Resulting from the repeated absorption and resonant response by the sample 8, the optical field tail is linearly enhanced and coupled out of the enhancement cavity 20 to the detector device 32. A large part of the original circulating cavity pulse 2 is eliminated by destructive interference (see dashed arrow), while the part of the cavity pulse 2 changed by the absorption is deflected to the detector device 32. In frequency domain, creating the optical field tail results in a sample specific change of the (complex) frequency comb spectrum of the circulating cavity pulses 2 compared with the (complex) frequency comb spectrum of the seed laser pulses 1. The detector device 32 is configured for sensing the sample specific change, e. g. by field resolved spectroscopy.

Details of creating the optical field tail and the detection thereof are described e. g. in [14] and [15].

Figure 9:
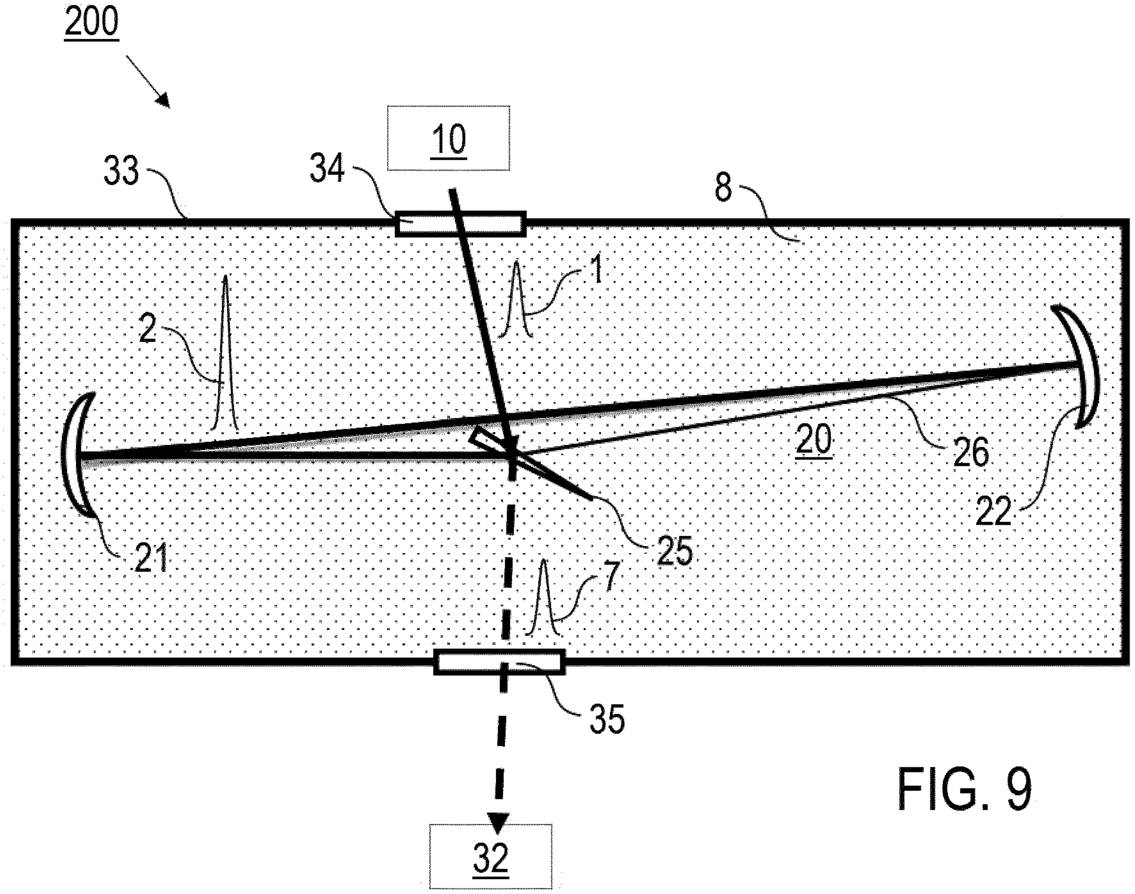
FIG. 9: an embodiment using a wedge-coupled cavity for sensitive absorption measurements.

FIG. 9 shows a different embodiment of the spectroscopic measuring apparatus 200 including an enhancement cavity 20 for trace gas detection, taking as an example the design of FIG. 7. The enhancement cavity 20 with two mirrors 21, 22 and a wedged coupling element 25 is housed in a gas-tight container 33 with an input window 34 and an output window 35. The container 33 is filled with the gaseous sample 8, e. g. a gas or gas mixture, to be analyzed. In this way, the full cavity beam path 26 of the enhancement cavity 20, still enhanced by a factor 2/πF, is applied for measuring the absorption. The seed laser pulse 1 is supplied via the input window 34 and the coupling element 25 into the enhancement cavity 20. As described with reference to FIG. 8, the molecular response of the sample 8 (optical field tail, portion 7 of the cavity pulse 2) is coupled out of the cavity 20 to the detector device 32, whereas the main cavity pulse 6 is eliminated by interference.

The features of the invention disclosed in the above description, the drawings and the claims can be of significance individually, in combination or sub-combination for the implementation of the invention in its different embodiments.

The invention claimed is:

1. A method of passively enhancing pulsed laser light by coherent addition of laser pulses in an enhancement cavity, comprising the steps of generating a sequence of seed laser pulses with a repetition frequency and a frequency comb spectrum comprising frequency comb lines with frequency comb line spacings equal to the repetition frequency, coupling the seed laser pulses via a first plate-shaped coupling element into an enhancement cavity comprising at least two cavity mirrors having metallic surfaces and spanning a cavity beam path with a resonator length L, wherein the enhancement cavity has a fundamental transverse and higher-order transverse cavity modes, each with a series of cavity resonance frequencies, and a cavity offset frequency, and coherent superposition of the seed laser pulses in the enhancement cavity, so that at least one enhanced circulating cavity pulse per cavity length is generated, wherein the frequency comb spectrum is a harmonic frequency comb spectrum with a vanishing seeding comb offset frequency, the enhancement cavity is adjusted such that a round-trip carrier-envelop phase slippage of the circulating cavity pulses is equal to 360°/N for the fundamental transverse mode, N being an integer number equal to or above 2, and a frequency overlap is provided for a plurality of the cavity resonance frequencies with a plurality of the frequency comb lines along the frequency comb spectrum.

2. The method according to claim 1, wherein the frequency overlap is provided by adjusting the resonator length L of the enhancement cavity according to $L^*=(c/f_{rep})/N$, c being the speed of light, and exciting the fundamental transverse mode of the enhancement cavity.

3. The method according to claim 1, wherein the frequency overlap is provided by exciting one of the higher-order transverse cavity modes, with n+m+1=N, of the enhancement cavity.

4. The method according to claim 1, wherein the seed laser pulses are created by difference frequency generation.

5. The method according to claim 1, wherein the first plate-shaped coupling element comprises at least one of the following features:

the first plate-shaped coupling element comprises a pellicle, a plate or a wedge element, the first plate-shaped coupling element has a one-sided anti-reflective coating, the first plate-shaped coupling element has a surface that is oriented at an angle equal or close to the Brewster angle relative to the cavity beam path, the first plate-shaped coupling element is transparent in a wavelength region between 7 μm and 12 μm, the first plate-shaped coupling element is made of polyethylene or diamond, the first plate-shaped coupling element has a thickness below a center wavelength of the seed laser pulses, and the first plate-shaped coupling element has a thickness in a range from 100 nm to 500 μm.

6. The method according to claim 1, wherein one of the cavity mirrors is placed outside a resonator plane spanned by the cavity beam path entering and leaving the first plate-shaped coupling element.

7. The method according to claim 6, wherein the enhanced circulating cavity pulse is reflected off the cavity mirror being placed outside the resonator plane with grazing incidence in s polarization, while the enhanced circulating cavity pulse passes the first plate-shaped coupling element in p polarization.

8. The method according to claim 1, further comprising the steps of providing a sample to be investigated in the enhancement cavity, such that the circulating cavity pulse interacts with the sample, and extracting sample-specific information from the circulating cavity pulse that has interacted with the sample.

9. The method according to claim 8, further comprising the step of after an interaction with the sample within the cavity, coupling an output portion of the circulating cavity pulses out of the enhancement cavity via the first plate-shaped coupling element or a separate second plate-shaped coupling element.

10. The mMethod according to claim 9, including at least one of the features the sample is a gaseous sample, the sample is arranged in an absorption tube accommodating a section of the cavity beam path of the enhancement cavity, the sample is supplied to a restricted region of the cavity beam path, and the sample is arranged in a container accommodating the enhancement cavity.

11. A laser pulse enhancement apparatus, being configured for passively enhancing pulsed laser light by coherent addition of laser pulses, comprising a laser source device being configured for generating a sequence of seed laser pulses with a repetition frequency and a frequency comb spectrum comprising frequency comb lines with frequency comb line spacings equal to the repetition frequency, an enhancement cavity comprising at least two cavity mirror having metallic surfaces and spanning a cavity beam path with a resonator length L, wherein the enhancement cavity has a fundamental transverse mode and higher-order transverse cavity modes, each with a series of cavity resonance frequencies, and a cavity offset frequency, and a first plate-shaped coupling element being arranged for coupling the seed laser pulses into the enhancement cavity, wherein the enhancement cavity is configured for a coherent superposition of the seed laser pulses coupled into the enhancement cavity, so that at least one enhanced circulating cavity pulse is generated, the laser source device is configured for generating the seed laser pulses having a harmonic frequency comb spectrum with a vanishing seeding comb offset frequency, the enhancement cavity is adjusted such that a round-trip carrier-envelop phase slippage of the at least one enhanced circulating cavity pulses is equal to 360°/N for the fundamental transverse mode, N being an integer number equal to or above 2, and the laser source device and the enhancement cavity are configured for providing a frequency overlap for a plurality of the cavity resonance frequencies with a plurality of the frequency comb lines along the frequency comb spectrum.

12. The laser pulse enhancement apparatus according to claim 11, wherein the resonator length L of the enhancement cavity is $L^*=(c/f_{rep})/N$, c being the speed of light, and the laser source device and the enhancement cavity are configured for coupling the seed laser pulses to the fundamental transverse mode of the enhancement cavity.

13. The laser pulse enhancement apparatus according to claim 11, wherein a mode matching device arranged between the laser source device and the enhancement cavity, is configured for mode-shaping the seed laser pulses and for coupling the seed laser pulses to one of the higher-order transverse cavity modes, with $n+m+1=N$, of the enhancement cavity.

14. The laser pulse enhancement apparatus according to claim 11, wherein the laser source device is configured for creating the seed laser pulses by difference frequency generation.

15. The laser pulse enhancement apparatus according to claim 11, wherein the first plate-shaped coupling element comprises at least one of the following features:

the first plate-shaped coupling element comprises a pellicle, a plate or a wedge element, the first plate-shaped coupling element has a one-sided anti-reflective coating, the first plate-shaped coupling element has a surface that is oriented at an angle equal or close to the Brewster angle relative to the cavity beam path, the first plate-shaped coupling element is transparent in a wavelength region between 7 μm and 12 μm, the first plate-shaped coupling element is made of polyethylene or diamond, the first plate-shaped coupling element has a thickness below a center wavelength of the seed laser pulses, and the first plate-shaped coupling element has a thickness in a range from 100 nm to 500 μm.

16. The laser pulse enhancement apparatus according to claim 11, wherein one of the cavity mirrors is placed outside a resonator plane spanned by the cavity beam path entering and leaving the first plate-shaped coupling element.

17. The laser pulse enhancement apparatus according to claim 16, wherein the laser source device and the enhancement cavity are configured such the enhanced circulating cavity pulse is reflected off the cavity mirror being placed outside the resonator plane with grazing incidence in s polarization, while the enhanced circulating cavity pulse passes the first plate-shaped coupling element in p polarization.

18. The laser pulse enhancement apparatus according to claim 11, wherein the first plate-shaped coupling element or a separate second plate-shaped coupling element is arranged for coupling an output portion of the circulating cavity pulses out of the enhancement cavity.

19. The laser pulse enhancement apparatus according to claim 11, wherein the enhancement cavity is adapted for accommodating a sample to be investigated, such that the circulating cavity pulses interact with the sample, and a detector device is arranged for extracting sample-specific information from the circulating cavity pulse that has interacted with the sample.

20. The laser pulse enhancement apparatus according to claim 19, including at least one of the features the sample is a gaseous sample, the enhancement cavity comprises an absorption tube accommodating a section of the cavity beam path of the enhancement cavity and further accommodating the sample, the enhancement cavity comprises a supply device being configured for supplying the sample to a restricted region of the cavity beam path, and the enhancement cavity is arranged in a container, that is filled with the sample.

* * * * *